United States Patent [19]

Ohmura

[11] Patent Number: 4,535,642
[45] Date of Patent: Aug. 20, 1985

[54] TRAVERSING MECHANISM
[75] Inventor: Ryuichi Ohmura, Shizuoka, Japan
[73] Assignee: Fuji Kogyo Co., Ltd., Japan
[21] Appl. No.: 489,356
[22] Filed: Apr. 28, 1983
[51] Int. Cl.³ .................... F16H 25/12; F16H 53/06
[52] U.S. Cl. .......................................... 74/58; 74/569
[58] Field of Search .................................. 74/58, 569

[56] References Cited
U.S. PATENT DOCUMENTS

| 2,008,217 | 7/1935  | Matravers  | 74/458 |
| 2,182,522 | 12/1939 | Lindsey    | 74/58  |
| 2,389,918 | 11/1945 | Macgill    | 74/58  |
| 2,554,971 | 5/1951  | Adler      | 74/58  |
| 2,578,771 | 12/1951 | Zint       | 74/58  |
| 3,465,602 | 9/1969  | Garaud     | 74/58  |
| 3,596,533 | 8/1971  | Nightingale| 74/569 |

FOREIGN PATENT DOCUMENTS 573386  2/1958  Italy ............................. 74/58

*Primary Examiner*—Lawrence J. Staab
*Attorney, Agent, or Firm*—Cantor and Lessler

[57] ABSTRACT

A traversing mechanism including a cam shaft on its outer surface an endless helical cam groove for reciprocation of a guide member, a cam shoe of the guide member adapted to engage with said cam groove, the guide member adapted to reciprocate along the axis of said cam shaft, and further including a cylindrical retaining portion formed on said guide member for receiving said cam shoe, wherein said cam shoe comprising a slidable member and a separate rotatable member adapted to be fitted into said cylindrical retaining portion, said slidable member being formed from a flat piece of hard ceramic material with its one end serving as an engaging end portion, and said rotatable member being in the cylindrical form and on its one end a retaining slot being grooved into which the other end of said slidable member being fitted for assembling of both members.

3 Claims, 9 Drawing Figures

FIG. 8
FIG. 9
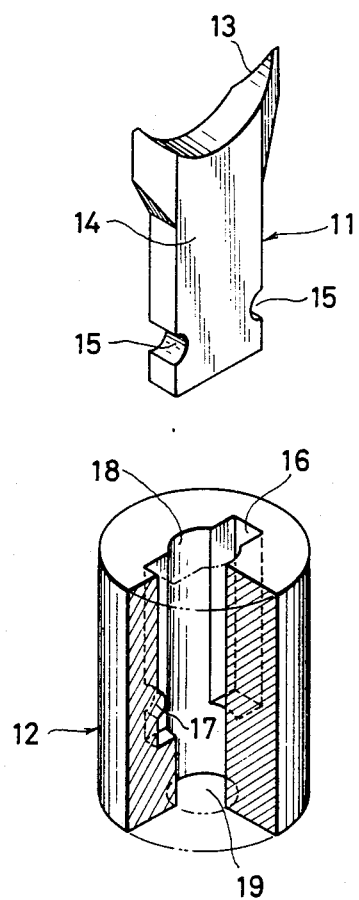
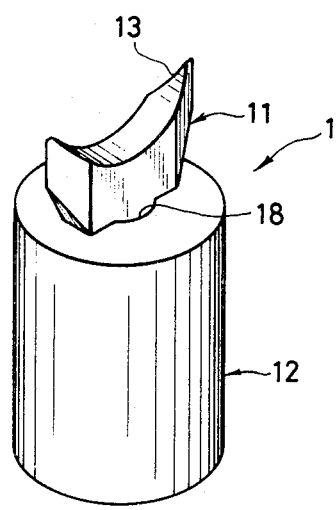

TRAVERSING MECHANISM

BACKGROUND OF INVENTION

The present invention relates generally to a traversing mechanism and more specifically relates to a traversing mechanism which includes a cam shaft having on its outer surface an endless cam groove for reciprocation, a cam shoe of guide assembly adapted to engage in the cam groove, and a cylindrical portion of the cam shoe rotatably adapted in a cylindrical retaining portion of a guide member.

However, the prior art has a disadvantage that the cam shoe of the guide assembly is so easily worn out to an extent which destroys the cam groove of the cam shaft. That is to say, the conventional cam shoe must be made of very hard material such as tungsten carbide, or engineering ceramics.

However, the process of fabricating those materials is very expensive, particularly to obtain the sophisticated shape used in the prior art.

SUMMARY OF THE INVENTION

The present invention has been accomplished to provide a solution to the problems by separation of a sophisticated cam shoe into a simply shaped slidable member and a rotatable member at the fabricating stage.

BRIEF DESCRIPTION OF THE DRAWINGS

The above-mentioned and other features of the present invention will become apparent from reading the following detailed description with reference to the drawings, in which:

FIG. 8 is an exploded view of another embodiment of the present invention; and

FIG. 9 is a sectional view of the assembled cam shoe according to said other embodiment.

PREFERRED EMBODIMENTS OF THE INVENTION

Figure 1:
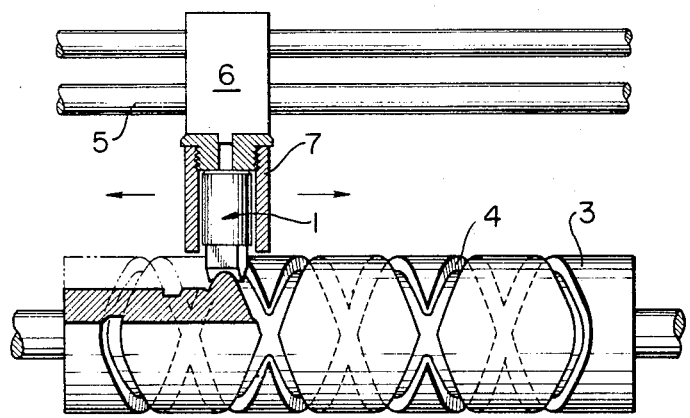
FIG. 1 is a partly cut away front view of the traversing mechanism to which the cam shoe of the present invention is applied.

Referring first to FIG. 1, cam shaft 3 is rotatable, and has on its outer surface a cam groove 4. A traverse bar 5 is provided along the axis of the cam shaft, to which a guide member 6 is slidingly attached. The guide member 6 is formed with a cylindrical retaining portion 7, in which a cam shoe 1 is rotatably inserted with its end being engaged with the cam groove 4.

Figure 2:
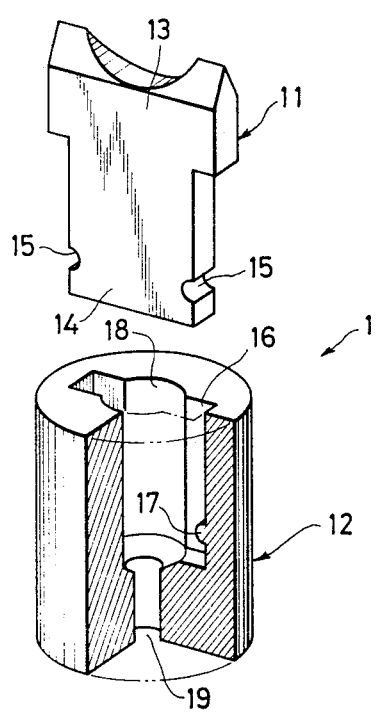
FIG. 2 is an exploded, perspective view of the cam shoe.
Figure 3:
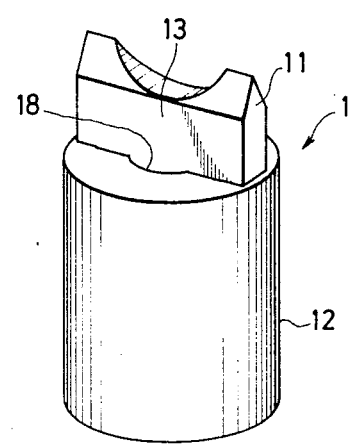
FIG. 3 is a perspective view of the assembled cam shoe.
Figure 4:
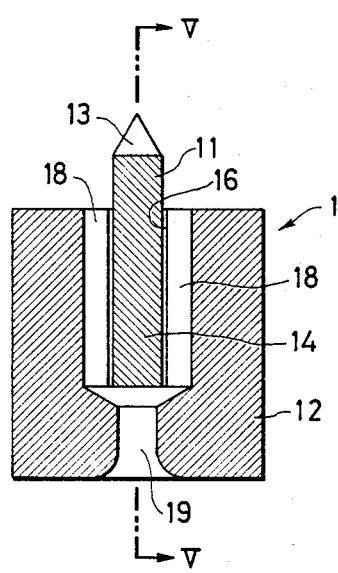
FIG. 4 is a sectional view of the same.
Figure 5:
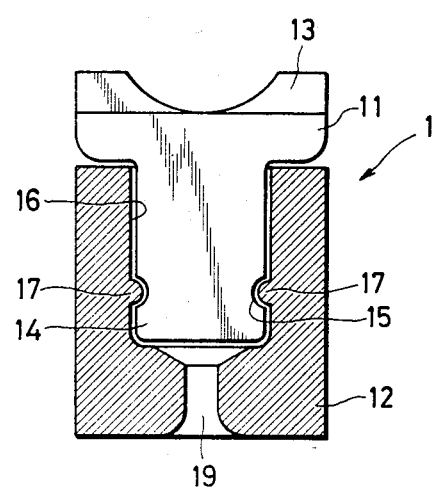
FIG. 5 is a section V-V of FIG. 4.

Referring in detail to the cam shoe 1, it comprises a slidable member 11 and a rotatable member 12, as will be understood from FIG. 2. The slidable member 11 is flat, including an engaging end portion 13. The side of the upper end of the engaging end portion is chamfered so as to assure its smooth running into the cam groove 4 on the cam shaft 3. In addition, the engaging end portion is recessed at its center so as to engage deeply within the cam groove 4.

On the other hand, the slidable member 11 includes a bottom end 14 made smaller in width than the engaging end portion 13 and is partly recessed to form an engaging portion 15. It will be understood, however, that the present invention is not limited to this embodiment.

Figure 6:
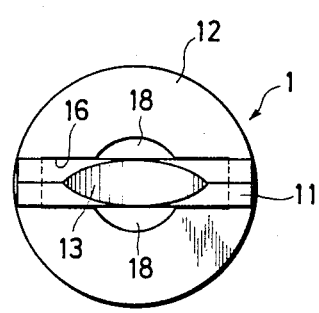
FIG. 6 is a plan view of the same.
Figure 7:
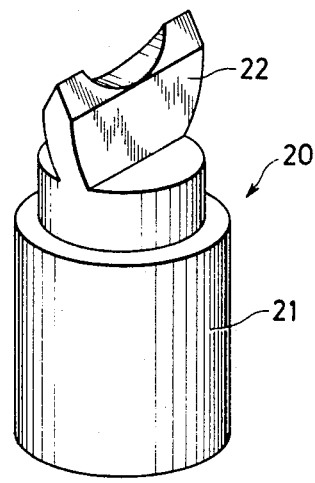
FIG. 7 is a perspective view showing the prior art cam shoe.

The rotatable member 12 as a whole is cylindrical, and slotted from its center of one end to form a retaining slot 16 for holding the slidable member 11. In the retaining slot 16 projection 17 which is to be fitted into the engaging portion 15 in the slidable member 11 is provided. It is noted that in retaining slot 16 a lubricating oil groove 18 has been formed as shown in FIG. 6. Furthermore, the rotatable member 12 is provided in its lower end portion with a throughhole 19 for feeding of lubricating oil.

As illustrated in FIGS. 8 and 9, the slidable member 11 has its both ends tapered to form guide means.

The material of which the slidable member 11 and the rotatable member 12 are formed will now be explained.

The slidable member 11 may be formed of hard ceramics, for example, sintered silicon nitride ($Si_3N_4$), or zirconia ($ZrO_2$) and zirconia ($ZrO_2$)-alumina ($Al_2O_3$). Such hard ceramics are essentially difficult to press, they can easily be formed into a simple shape which the slidable member of the present invention takes on. On the other hand, the rotatable member may be formed of suitable materials such as hard plastics, brass or stainless steel. Assembling of both parts may be achieved only by fitting the slidable member 11 pressed into the rotatable member 12.

As mentioned above, the cam shoe which has heretofore been formed as an integral piece is divided into a slidable member and a rotatable member, which are formed of separate suitable materials. Thus, the slidable member shall be made of a ultra-hard anti-abrasive material.

What is claimed is:

1. A traversing mechanism comprising a guide member and a cam shaft having on its outer surface an endless helical cam groove, said guide member comprising a cam shoe adapted to engage with said cam groove to thereby cause the guide member to reciprocate along the axis of said cam shaft, and further including a cylindrical retaining portion having an axis essentially perpendicular to said cam shaft axis for receiving said cam shoe, said cam shoe comprising a rotatable member rotatably fitted into said cylindrical retaining portion and a separate slidable member fixedly mounted in said rotatable member, said slidable member being formed from a flat piece of hard ceramic material with one end serving as an engaging end portion to engage said cam groove and slide therein, and said rotatable member being cylindrical and having at one end a grooved retaining slot into which the other end of said slidable member is fitted for assembling of both members.

2. A traversing mechanism as defined in claim 1, wherein said separate rotatable member is formed of a plastic selected from the group consisting of polyacetal and graphite molybdenum filled polytetrafluoroethylene.

3. A traversing mechanism as defined in claim 2, wherein said rotatable member contains lubricating oil grooves between said slidable member and rotatable member.

* * * * *